2,828,429
DEVICE FOR OPERATING ROLLING BLINDS

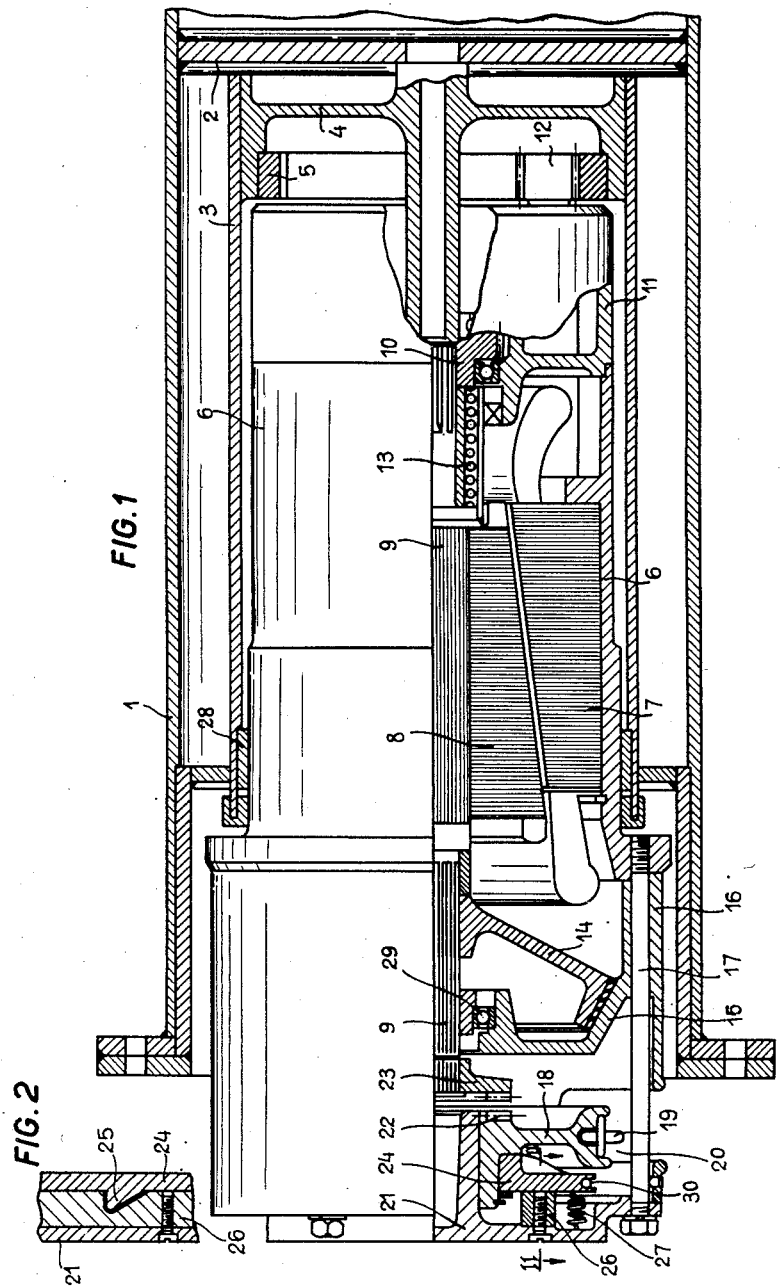

Fernando Creonti, Turin, Italy, assignor to Fata, S. r. l., Turin, Italy

Application July 13, 1954, Serial No. 443,114

Claims priority, application Italy July 29, 1953

5 Claims. (Cl. 310—67)

This invention relates to a mechanical control for rolling blinds.

An object of this invention is to provide a mechanical control for rolling blinds which is enclosed within the blind winding drum, whereby any external equipment for the arrangement of the motor and transmission is eliminated.

The device comprises chiefly an electric motor of which the shaft coincides with the drum axis and rotates the drum over a reducing gear, a brake, and means for rotating the drum by hand in case of emergency. The unit is enclosed within a stationary cylindrical casing which is arranged within the blind winding drum.

The motor is of the conical rotor type in order to axially displace as it starts operating the shaft in order to automatically release the brake, the brake being blocked by the action of a spring acting on said shaft as current supply is cut off from the motor.

The brake comprises two conical discs between which a layer of a material of very high friction coefficient is interposed. One of the discs is carried by the stationary cylindrical casing and the other disc is keyed to the motor shaft.

The means for rotating the drum by hand comprise a grooved pulley loosely mounted on a hub on one end portion of the stationary casing about which a driving chain is wound. The pulley is axially displaced by the action of a face cam controlled by traction on a cable for coupling a dog clutch holding the pulley to the motor shaft and simultaneously displacing in an axial direction the shaft in order to release the brake.

The invention shall be described in detail with reference to the accompanying drawing which shows by way of a non-limiting example an embodiment thereof.

Figure 1 is a part axial sectional view of the device, and

Figure 2 is a sectional view on line II—II of Figure 1.

1 denotes the blind winding drum rotatably mounted in a stationary structure (not shown). 2 denotes a partition confining within the drum a chamber adapted to house the device according to this invention.

A disc 4 is placed beside the partition 2 and has fixedly secured thereto an internally toothed rim 5 and attached to the drum 1 by means of a tubular member 3 carrying at one end a bushing 28 to rotate with respect to a stationary cylindrical casing 6 fast with the above mentioned stationary structure arranged within the tubular member 3 enclosing controls for rotating the drum 1.

A laminated core 7 carrying a field winding of the electric motor is arranged in the central portion of the casing 6, its armature 8 of conical shape being carried by a shaft 9 coinciding with the axis of the drum 1 and being axially displaceable against the action of a spring 13.

The shaft 9 carries at its end facing the disc 4 a toothed wheel 10 adapted to drive a reducing gear 11 of known construction, a pinion 12 meshing with the internally toothed rim 5 fast with the winding drum 1.

The shaft 9 carries at its opposite end a disc 14 provided with a conical surface lined with a material of high friction coefficient and facing a cooperating conical surface on a stationary disc 15.

The disc 15 guides the shaft 9 through an antifriction bearing 29 and is fast with a cylindrical member 16 forming an end section of the casing 6 at its side opposite the partition 2 secured thereto by means of bolts 17.

The member 16 is enclosed at its externally protruding end by a head member 21 provided with a central hub around which a loose pulley 18 coaxial with the shaft 9 is mounted for rotation and axial displacement, having a grooved periphery to receive a driving chain 19 issuing through a slot 20 in the member 16. The pulley 18 is provided with dog teeth 22 adapted to mesh with a cooperating set of teeth 22' in a member 23 keyed to the shaft 9.

A disc 24 is mounted rotatable but prevented from axial displacement along the hub of the pulley 18, the rotation of the disc through a limited angle being controllable by means of a cable 30 wound thereabout and provided with front projections 25 of axial cam shape cooperating with a shaped ring 26 secured to the head member 21. The disc 24 is normally maintained close to the ring 26 so that the projections 25 reach into the cooperating recesses in the ring by the action of a spring 27.

The device operates as follows.

In its inoperative position the motor shaft 9 is axially pushed to the left by a spring 13 thereby holding the conical discs 14 and 15 close to each other in the braking condition. On closure of the electric circuit of the motor, the conical armature 8 is moved to the right bodily with the shaft, thereby releasing the brake and rotating the winding drum 1 through the reducing gear 11.

In case of failure of the electric power or damage to the motor, the winding drum can be rotated by hand by moving the disc 24 through a small angle by means of the cable 30, whereby the projections 25 on the disc are raised flush with the flat portion on the ring 26, which axially displaces the disc 24 and pulley 18 enough to close the dog clutch 22—23 and axially displace the shaft 9 to the right for releasing the brake.

By maintaining the disc 24 in this position it is possible to rotate the pulley 18 by means of the chain 19 for rotating the drum 1 through the shaft 9 and reducing gear 11.

On release of the cable 30, the disc 24 and pulley 18 are returned to the left to their inoperative position by the action of the return spring 27, the device being ready for operation under the action of the motor 8.

What I claim is:

1. Device for operating rolling blinds of the type in which the blind is wound on a winding drum, comprising a stationary casing extending within the said drum, an electric motor supported by said casing, a gearing for transmitting rotation from said motor to said drum, a brake for said motor, a spring for actuating said brake when the motor is inoperative, means for automatically releasing said brake upon operation of said motor; means operated by hand supported by said stationary casing for rotating the said winding drum, a normally disengaged coupling interposed between said hand operated wheel and said drum and hand operated means for engaging said coupling and simultaneously disengaging said brake.

2. Device as claimed in claim 1, wherein said means operated by hand for rotating the said winding drum comprises a pulley provided with a grooved periphery and a driving chain for rotating said pulley, said pulley being coaxial with the said motor shaft, situated within a section of said stationary casing laterally projecting beyond one end of said drum and supported for rotation and axial displacement on a cylindrical member extending inside said casing and fast therewith, the hub of the said pulley being provided at its side facing the drum with a set of dog teeth facing a set of complementary dog teeth provided on a member keyed at the end of the motor projecting beyond the said brake.

3. Device as claimed in claim 2, wherein upon the hub of the said pulley is mounted rotatably but prevented from axial displacement thereto a disc normally urged by a set of helical springs interposed therebetween and the end of the said stationary casing projecting outwardly from the drum against an annulus fast with said casing, said disc being provided at its face contacting with said annulus with a circular row of frontal cams and said annulus with an equal number of complementary recesses, at the periphery of said disc being cut a groove for receiving a cable secured by one end to said disc for rotating the latter with respect to said annulus.

4. Device as claimed in claim 3, wherein the said stationary casing is made up of three portions, the central portion enclosing the motor and the side portions enclosing the reducing gear and brake with hand control, respectively.

5. Device as claimed in claim 1, wherein said motor comprises a stationary field winding and an armature which is rotatable and axially shiftable, and in which said brake comprises a stationary disc and a rotatable disc fixed to said armature, said discs being engageable with one another by axial shifting of said armature and said spring for actuating said brake acting on said armature in a direction to engage said discs.

References Cited in the file of this patent
UNITED STATES PATENTS

| 1,742,094 | Perks | Dec. 31, 1929 |
| 1,771,281 | Wilsing | July 22, 1930 |
| 2,694,781 | Hinz | Nov. 16, 1954 |